US012655244B2

(12) United States Patent
Delmas et al.

(10) Patent No.: US 12,655,244 B2
(45) Date of Patent: Jun. 16, 2026

(54) PRESS COVER FOR A SHOE PRESS OR TRANSPORT BELT WITH IMPROVED HYDROPHOBICITY

(71) Applicant: Voith Patent GmbH, Heidenheim (DE)

(72) Inventors: Delphine Delmas, Heidenheim (DE); Uwe Matuschczyk, Geislingen (DE)

(73) Assignee: Voith Patent GmbH, Heidenheim (DE)

( * ) Notice: Subject to any disclaimer, the term of this patent is extended or adjusted under 35 U.S.C. 154(b) by 574 days.

(21) Appl. No.: 18/247,907

(22) PCT Filed: Aug. 20, 2021

(86) PCT No.: PCT/EP2021/073105
§ 371 (c)(1),
(2) Date: Apr. 5, 2023

(87) PCT Pub. No.: WO2022/073678
PCT Pub. Date: Apr. 14, 2022

(65) Prior Publication Data
US 2023/0374190 A1 Nov. 23, 2023

(30) Foreign Application Priority Data

Oct. 5, 2020 (DE) ..................... 10 2020 126 004.0

(51) Int. Cl.
C08G 18/44 (2006.01)
C08G 18/32 (2006.01)
(Continued)

(52) U.S. Cl.
CPC ......... *C08G 18/3203* (2013.01); *C08G 18/44* (2013.01); *D21F 3/0236* (2013.01); *D21G 1/0233* (2013.01)

(58) Field of Classification Search
CPC ...... C08G 18/44; D21F 3/0236; D21G 1/0233
See application file for complete search history.

(56) References Cited

U.S. PATENT DOCUMENTS

| | | |
|---|---|---|
| 10,731,294 B2 | 8/2020 | Hikida |
| 11,168,172 B2 | 11/2021 | Hahn et al. |
| | | (Continued) |

FOREIGN PATENT DOCUMENTS

| | | |
|---|---|---|
| CN | 107614790 A | 1/2018 |
| DE | 102011079893 A1 | 1/2013 |
| | (Continued) | |

*Primary Examiner* — Michael L Leonard
(74) *Attorney, Agent, or Firm* — Laurence A. Greenberg; Werner H. Stemer; Ralph E. Locher

(57) ABSTRACT

A press cover for a press roll or a transport belt has at least one polyurethane-containing layer. The polyurethane is obtainable by reaction of i) a polyol component, ii) an isocyanate component, and iii) a component containing at least one crosslinker. The polyol component is composed of mutually different structural units having the general formula $-O-R^1-X-R^2-O-$ in which all of $R^1$ and $R^2$ independently of one another are identical or different and are linear or branched $C_1$-$C_{20}$ alkylene groups. Groups X are identical or different and are selected from bond, O, C(O)—O, and O—C(O)—O. At least 70 wt % of the structural units meet the following criteria: a) at least 80% of X are O—C(O)—O and the remainder are O or C(O)—O, and b) the average chain length of $R^1$ and $R^2$ is 8 or more carbon atoms, and c) at least 50% of $R^1$ and $R^2$ are independently of one another a linear or branched $C_8$-$C_{12}$ alkylene group.

24 Claims, 1 Drawing Sheet

(51) Int. Cl.
    *D21F 3/02*          (2006.01)
    *D21G 1/02*          (2006.01)

(56)            References Cited

U.S. PATENT DOCUMENTS

| | | |
|---|---|---|
| 2015/0308044 A1 | 10/2015 | Delmas et al. |
| 2017/0073466 A1* | 3/2017 | Kusano .................... D01F 6/70 |
| 2020/0165777 A1 | 5/2020 | Delmas et al. |
| 2021/0269577 A1* | 9/2021 | Takamori .............. D21F 3/0227 |
| 2021/0269977 A1* | 9/2021 | Takamori .............. C08K 5/0025 |
| 2021/0269978 A1* | 9/2021 | Takamori ........... C08G 18/7614 |

FOREIGN PATENT DOCUMENTS

| | | |
|---|---|---|
| DE | 102011079894 A1 | 1/2013 |
| DE | 102013222458 A1 | 5/2015 |
| EP | 2284314 A1 | 2/2011 |
| EP | 2737124 B1 | 6/2017 |
| EP | 3372625 A1 | 9/2018 |
| EP | 3875680 A1 | 9/2021 |
| JP | 2015017183 A | 1/2015 |

* cited by examiner

PRESS COVER FOR A SHOE PRESS OR TRANSPORT BELT WITH IMPROVED HYDROPHOBICITY

FIELD AND BACKGROUND OF THE INVENTION

The present invention relates to a press cover for a press roll, more particularly for a press roll of a shoe press for dewatering a fibrous web, more particularly a paper, cardboard, tissue or pulp web, or transport belt, more particularly for a machine for producing or treating a fibrous web, more particularly paper, cardboard or tissue machine, where the press cover or the transport belt comprises at least one polyurethane-containing layer. The present invention further relates to a method for producing such a press cover or transport belt, to a corresponding press cover, and to a corresponding transport belt.

Press rolls are employed in a multitude of presses and for example in the form of shoe rolls in shoe presses, which are in turn used especially for dewatering fibrous webs, such as paper webs. Such shoe presses are constructed from a shoe roll and an opposing roll, with a press nip formed between them. Shoe rolls here consist of a stationary, i.e., nonrotating, press element, namely the shoe, and of a flexible press cover which runs around the shoe. The shoe is typically supported by a yoke which carries it, and pressed via hydraulic press elements against the press cover running around these elements. Between the shoe and the press cover there is generally an oil film built up for lubrication. The concave architecture of the shoe at its side opposite the opposing roll produces a comparatively long press nip, which is about 20 times longer than that of conventional presses consisting of two rotating rolls.

In the operation of the shoe press, a fibrous web is passed together with one or two press felts through the press nip, and the liquid which emerges from the fibrous web because of the pressure exerted on the fibrous web in the press nip, this liquid containing not only water but also dissolved and undissolved compounds, such as fibers, fiber fragments, fillers and/or additives, for example, is temporarily taken up by the press felt and by depressions made in the press cover surface. After leaving the press nip, the liquid taken up by the press cover is spun off from the press cover, after which the press cover enters the press nip again. Moreover, the water taken up by the press felt is removed with suction elements after it has left the press nip. Owing to the press nip, which is comparatively long because of the concave architecture of the shoe, a shoe press of this kind, in comparison to a press consisting of two rotating rolls, achieves substantially better dewatering of the fibrous web, and so the subsequent thermal drying can be made shorter correspondingly. In this way, the dewatering of the fibrous web that is achieved is particularly gentle.

A press cover in such a shoe press must ideally meet a multiplicity of requirements in order to lead to optimal results. First, such a press cover must be sufficiently flexible in order to be able to be passed around the shoe. At the same time, the press cover must be stiff enough not to undergo excessive distortion and deformation under the pressing load prevailing in the press nip. A press cover, moreover, is required to exhibit high wear resistance, good abrasion resistance, high cracking resistance, good resistance to crack propagation, and a high resistance toward chemicals, such as, in particular, water, oil, acids, bases, and solvents. In particular a press cover must exhibit a very high hydrophobicity on the paper side.

Especially in paper, card or tissue machines, transport belts are employed which must meet at least some of the aforesaid requirements and in particular must have a very high hydrophobicity on their paper side. For example, such transport belts are used in the press section of such machines, to transport a fibrous web through the press nip and subsequently to a transfer point, at which the fibrous web is passed over to the subsequent drying section. Such transport belts generally comprise at least one polymer coating which provides the paper side of the belt and in which a load-accommodating, textile sheetlike structure is embedded.

In order at least partly to meet these multivarious requirements, such press covers are typically constructed of fiber-reinforced polyurethane, namely from a composite material comprising a laid fiber fabric or woven fiber fabric embedded in a matrix of crosslinked polyurethane. Both single-ply and corresponding multi-ply press covers are known in this context.

EP 2 284 314 A1 discloses a press cover for a shoe press that is composed of one or more plies of crosslinked polyurethane with woven fiber fabric embedded therein. The crosslinked polyurethane here is the reaction product of a prepolymer produced from a polyol and from an isocyanate component containing 55 to 100 mol % of p-phenylene diisocyanate, and of a crosslinker component containing 65 to 100 mol % of one or more particular polyamines. The polyol is preferably polytetramethylene glycol.

EP 2 737 124 B1 discloses a press cover for a shoe press, or a transport belt, with the press cover or the transport belt comprising at least one layer that contains a crosslinked polyurethane which is obtainable by a process in which a prepolymer—which is the reaction product of an isocyanate component containing methylenediphenyl diisocyanate and a polyol component containing a polycarbonate polyol—is reacted with a crosslinker component which contains at least one polyol having a weight-average molecular weight of more than 1000 g/mol. The polycarbonate polyol used comprises, for example, polycarbonate polyol based on hexanediol.

Although the above press covers have good mechanical properties and high resistance toward water and chemicals, their hydrophobicity, particularly on their paper side, is in need of improvement.

SUMMARY OF THE INVENTION

An object of the present invention, therefore, is to provide a press cover or a transport belt where the press cover or the transport belt has an improved hydrophobicity but is nevertheless distinguished by excellent wear resistance, outstanding abrasion resistance, excellent cracking resistance, outstanding resistance to crack propagation, low swelling, high resistance toward chemicals, such as water, oil, acids, bases, and solvents, in particular, an excellent flexibility, and an outstanding stiffness.

In accordance with the invention, this object is achieved through the provision of a press cover for a press roll, more particularly for a press roll of a shoe press for dewatering a fibrous web, more particularly a paper, cardboard, tissue or pulp web, or a transport belt, more particularly for a machine for producing or treating a fibrous web, more particularly paper, cardboard or tissue machine, where the press cover or the transport belt comprises at least one polyurethane-containing layer, where the polyurethane is obtainable by reaction in one or more steps of i) a polyol component, ii) an isocyanate component, and iii) a component containing at least one crosslinker, where the polyol component of the polyurethane is composed to an extent of at least 90 wt % of one or more mutually different structural units according to the following general formula (I), $$-O-R^1-X-R^2-O- \hspace{3cm} (I),$$

in which all of $R^1$ and $R^2$ in the one or more different structural units according to the general formula (I) independently of one another are identical or different and are selected from linear $C_1$-$C_{20}$ alkylene groups and branched $C_1$-$C_{20}$ alkylene groups, and all of groups X in the one or more different structural units independently of one another are identical or different and are selected from bond, O, C(O)—O and O—C(O)—O, wherein at least 70 wt % of the structural units according to the general formula (I) meet the following criteria:

a) at least 80% of the groups X are O—C(O)—O and the remainder of the groups X are selected from O and C(O)—O, and b) the average chain length of all the groups $R^1$ and $R^2$ is 8 or more than 8 carbon atoms, and c) at least 50% of the groups $R^1$ and $R^2$ are independently of one another each a linear or branched $C_8$-$C_{12}$ alkylene group.

Surprisingly it has been determined in the context of the present invention that a layer of polyurethane whose polyol component is composed to an extent of at least 90 wt % of one or more mutually different structural units according to the general formula (I), i.e., of polyol groups of which at least 70 wt % meet the criteria a) to c), exhibits improved hydrophobicity especially on its surfaces. It was surprising, moreover, that a polyurethane layer of this kind is nevertheless distinguished by excellent wear resistance, outstanding abrasion resistance, excellent cracking resistance, outstanding resistance to crack propagation, low swelling, high resistance toward chemicals, such as water, oil, acids, bases, and solvents, in particular, an excellent flexibility, and an outstanding stiffness.

By composed "of one or more mutually different" structural units according to the general formula (I) is meant, according to the present invention, that the polyol component of the polyurethane contains a multiplicity of such structural units according to the general formula (I), where the individual structural units may each be identical or may differ from one another. In particular, therefore, this phrasing also embraces polyurethanes containing in each case a multiplicity of, for example, three different structural units, with each of the three different structural units having the general formula (I) but with each of the three different structural units differing from each of the two others. For example, in one of the three different structural units according to the general formula (I), the group X may be a carbonate group, the group $R^1$ a nonylene group, and the group $R^2$ a decylene group; in another of the three different structural units according to the general formula (I), the group X may be a carbonate group, the group $R^1$ a nonylene group, and the group $R^2$ a dodecylene group; and in the third of the three different structural units according to the general formula (I), the group X may be a carbonate group and the groups $R^1$ and $R^2$ may each be a nonylene group. Furthermore, "composed of one or more mutually different structural units according to the general formula (I)" does not mean that the individual structural units are joined directly to one another. They may instead be present separated from one another by one or more atoms in a molecular chain.

An alkylene group in the sense of the present invention refers to a $C_nH_{2n}$ hydrocarbon group, this being a hydrocarbon group having two terminal radicals.

Polyols in the sense of the present invention refer to all alcohols which have at least two hydroxyl groups and preferably have a weight-average molecular weight of 500 to 10 000 g/mol. Preferred polyols according to the present invention are diols and more particularly those having the aforesaid molecular weight, i.e., long-chain polyols and hence not short-chain polyols, such as 1,4-butanediol, for example.

This polyol component of the polyurethane is composed to an extent of at least 90 wt % of one or more mutually different structural units according to the general formula (I)—that is, of polyol groups. The polyol component of the polyurethane is composed preferably to an extent of 95 to 100 wt % of one or more mutually different structural units according to the general formula (I). The polyol groups hence form a main constituent of the polyurethane and not just a small constituent.

The polyurethane of the invention may be but need not be a castable polyurethane and/or a thermoplastic polyurethane. It may have been obtained, for example, from at least one prepolymer and at least one crosslinker, or by reaction of the polyol component, the isocyanate component, and the crosslinker in one step. If the polyurethane has been obtained from at least one prepolymer and at least one crosslinker, then the polyol structural units in these polyurethanes are automatically present in the prepolymer part and may—but need not—be additionally present in the crosslinker as well.

In accordance with the invention, at least 70 wt % of the structural units according to the general formula (I) meet the three aforesaid criteria a) to c). It is essential, accordingly, that the majority of the polyol structural units contained in the polyurethane and according to the general formula (I) meet the three aforesaid criteria a) to c), with no detriment resulting from a minor number of the polyol structural units not, or not fully, meeting these criteria. Good results, however, are obtained in particular if at least 80 wt %, more preferably at least 90 wt %, very preferably at least 95 wt %, and most preferably all of the one or more mutually different structural units according to the general formula (I) meet in each case the criteria a) to c).

In a development of the inventive concept, it is proposed that all of groups $R^1$ and $R^2$ of the at least 70 wt % of one or more different structural units according to the general formula (I) which meet the criteria a) to c), and preferably also those of the possibly up to 30 wt % of other structural units according to the general formula (I) that do not, or at least not completely, meet the criteria a) to c) are, independently of one another, identical or different and are selected from linear $C_4$-$C_{14}$ alkylene groups and branched $C_4$-$C_{14}$ alkylene groups and very preferably from linear $C_6$-$C_{14}$ alkylene groups and branched $C_6$-$C_{14}$ alkylene groups. With preference, at least in the case of the at least 70 wt % of the structural units according to the general formula (I) that meet the criteria a) to c), it is the case, in accordance with criterion c), that at least 50%, preferably at least 80%, more preferably at least 90% and most preferably all of the groups $R^1$ and $R^2$ in each case independently of one another are a linear or branched $C_8$-$C_{12}$ alkylene group.

According to one more-preferred embodiment of the present invention, at least 90%, more preferably at least 95%, very preferably at least 99%, and most preferably all of the groups X of the at least 70 wt % of one or more different structural units according to the general formula (I) that meet the criteria a) to c), and preferably all, including the maximum of less than 30 wt %, of one or more different structural units according to the general formula (I) that do not, or not completely, meet the criteria a) to c), are carbonate groups O—C(O)—O. The extent of the hydrophobicity in the case of this embodiment is determined in particular by the length of the groups $R^1$ and $R^2$. In this embodiment, however, the degree of crystallinity may be comparatively high.

For applications in which a reduced degree of crystallinity is desired, it is proposed, in a development of the inventive concept, that the polyurethane contains not only polycarbonate polyol groups, i.e., not only structural units according to the general formula (I) in which the group X is O—C(O)—O, but also other polyol groups, such as, in particular, polyether polyol groups, i.e., structural units according to the general formula (I) in which all the groups X are O, or polyether polycarbonate groups, i.e., structural units according to the general formula (I) in which some of the groups X are O and others of the groups X are O—C(O)—O. Examples of suitable polyether polyols are, for example, polytetramethylene glycol and polypropylene glycol. In this embodiment, preferably 80% to 99% and more preferably 85% to 95% of the groups X of the one or more different structural units according to the general formula (I) have O—C(O)—O as group X, and the balance to 100% of the groups X of the one or more different structural units according to the general formula (I) have O as group X.

Another way of reducing the degree of crystallinity of the polyurethane is for at least some of the groups $R^1$ and $R^2$ in the structural units according to the general formula (I) to be branched alkylene groups and more particularly branched $C_{8\text{-}12}$ alkylene groups. In this embodiment, preferably, more than 1% to 30% of the groups $R^1$ and $R^2$ of the structural units according to the general formula (I) are branched alkylene groups, while the balance to 100% of the groups $R^1$ and $R^2$ are linear alkylene groups.

It has been recognized in the context of the present invention, moreover, that the degree of crystallinity of the polyurethane can be reduced if the structural units according to the general formula (I) contain groups $R^1$ which have a different carbon chain length than the groups $R^2$.

In accordance with criterion b), the average chain length of all the groups $R^1$ and $R^2$ in the at least 70 wt % of one or more mutually different structural units according to the general formula (I) that meet the criteria a) to c) is 8 or more than 8 carbon atoms. This average carbon chain length refers to the arithmetic mean, i.e., to the sum of the carbon chain lengths of all groups $R^1$ and $R^2$ in these structural units divided by the total number of groups $R^1$ and $R^2$ in these structural units. However, the average chain length of all groups $R^1$ and $R^2$ ought also not to be too large. Good results are obtained in particular if the average chain length of all the groups $R^1$ and $R^2$ of the at least 70 wt % of one or more different structural units according to the general formula (I) that meet the criteria a) to c) is 8 to 15, more preferably more than 8 to 12, and very preferably 9 to 11.

The conditions stated above are preferably valid not only for the at least 70 wt % of one or more different structural units according to the general formula (I) that meet the criteria a) to c), but also preferably for all structural units according to the general formula (I), in other words also for those at most less than 30 wt % which do not, or not completely, meet the criteria a) to c). It is therefore preferable for the average chain length of all the groups $R^1$ and $R^2$ of all the structural units according to the general formula (I)

to be 8 or more than 8 carbon atoms, more preferably 8 to 15 or more than 8 to 15, more preferably more than 8 to 12, and very preferably 9 to 11.

6 In accordance with criterion c), at least 50% of the groups $R^1$ and $R^2$ in the at least 70 wt % of one or more mutually different structural units according to the general formula (I) that meet the criteria a) to c) are independently of one another in each case a linear or branched $C_8\text{-}C_{12}$ alkylene group. Good results are obtained in particular if at least 70%, more preferably at least 80%, very preferably at least 90%, especially preferably at least 95%, and most preferably all of the groups $R^1$ and $R^2$ of the one or more different structural units according to the general formula (I) independently of one another are each a linear or branched $C_6\text{-}C_{14}$ alkylene group or a linear or branched $C_8\text{-}C_{12}$ alkylene group.

The aforesaid conditions are preferably valid not only for the at least 70 wt % of one or more different structural units according to the general formula (I) that meet the criteria a) to c), but instead preferably for all structural units according to the general formula (I), in other words also for those not more than less than 30 wt % which do not, or not completely, meet the criteria a) to c). It is therefore preferable for at least 50%, more preferably at least 70%, more preferably still at least 80%, very preferably at least 90%, especially preferably at least 95%, and most preferably all of the groups $R^1$ and $R^2$ of all structural units according to the general formula (I) independently of one another to be in each case a linear or branched $C_6\text{-}C_{14}$ alkylene group or a linear or branched $C_8\text{-}C_{12}$ alkylene group.

In a development of the inventive concept, it is proposed that at least a portion of the structural units according to the general formula (I) are oligomers, specifically having the general formula (II):

$$\text{—(O—R}^3\text{—O—C(O))}_{n1}\text{—O—} \qquad \text{(II),}$$

in which the group $R^3$ is selected from linear $C_1\text{-}C_{20}$ alkylene groups and branched $C_1\text{-}C_{20}$ alkylene groups, and $n_1$ is an integer of at least 3. If at least 60 wt % of the structural units according to the general formula (I) have the general formula (II), the group $R^3$ must be a $C_8\text{-}C_{12}$ alkylene group, since otherwise criterion c) would not be met.

Preferably $n_1$ is an integer between 3 and 100 and more preferably between 4 and 25.

It is preferred, furthermore, that the weight-average molecular weight of the structural units according to the general formula (II) is 500 to 10 000 g/mol, more preferably 800 to 4000 g/mol, and very preferably 1000 to 3000 g/mol. The molecular weight may be determined by gel permeation chromatography against a polystyrene standard. According to the present invention, however, it is preferred to determine the weight-average molecular weight of the structural units by way of the hydroxyl number, i.e., via the amount of potassium hydroxide in milligrams which is equivalent to the amount of acetic acid bound in the acetylation of 1 g of substance. The hydroxyl number may be performed by back-titration in accordance with DIN 53240 and is reported in mg KOH/g. The weight-average molecular weight may be determined by dividing 112 200 by the hydroxyl number.

In this embodiment as well it is preferable for the groups $R^3$ of the structural units according to the general formula (II) to be selected from linear $C_6\text{-}C_{14}$ alkylene groups and branched $C_6\text{-}C_{14}$ alkylene groups and preferably from linear $C_8\text{-}C_{12}$ alkylene groups and branched $C_8\text{-}C_{12}$ alkylene groups, such as, most preferably, from linear $C_{10}$ alkylene groups and branched $C_{10}$ alkylene groups.

In a development of the inventive concept, it is proposed that at least 50 wt %, more preferably at least 70 wt %, very preferably at least 80 wt %, very preferably at least 90 wt %, of all, and most preferably all, of the structural units according to the general formula (I) have the general formula (II). Particularly in the case of a very high fraction of structural units according to the general formula (II), the degree of crystallinity of the polyurethane may be comparatively high.

For applications in which a reduced degree of crystallinity is desired, it is proposed, in a development of the inventive concept, that the polyurethane comprises not only polycarbonate polyol groups, i.e., not only structural units according to the general formula (II), but also other polyol groups, such as, in particular, polyether polyol groups, i.e., structural units according to the general formula (I) in which the group X is O, or polyether polycarbonate groups, i.e., structural units according to the general formula (I) in which some of the group X is O and other of the group X is O—C(O)—O. Suitable examples of such a polyether polyol are, for example, polytetramethylene glycol and polypropylene glycol. In this embodiment, preferably 80% to 99% and more preferably 85% to 95% of the structural units according to the general formula (I) have the general formula (II), whereas the remainder of the structural units have the general formula (I) in which the group X is O.

As set out above, another way of reducing the degree of crystallinity of the polyurethane in the case of this embodiment is to provide branched alkylene groups and more particularly branched $C_{8\text{-}12}$ alkylene groups as groups $R^3$ in the general formula (II).

According to a further particularly preferred embodiment of the present invention, at least a portion of the structural units according to the general formula (I) has the general formula (III):

$$\text{—(O—R}^4\text{—O—C(O)—O—R}^5\text{—O—C(O))}_{n2}\text{—O—} \qquad \text{(III),}$$

in which $R^4$ and $R^5$ are different from one another and independently of one another are selected from linear $C_1\text{-}C_{20}$ alkylene groups and branched $C_1\text{-}C_{20}$ alkylene groups, and $n_2$ is an integer of at least 2. Where at least 60 wt % of the structural units according to the general formula (I) have the general formula (III), the groups $R^4$ and $R^5$ must be a $C_8\text{-}C_{12}$ alkylene group, since otherwise criterion c) would not be met.

Preferably $n_2$ is an integer between 2 and 50 and more preferably between 2 and 12.

It is further preferred for the weight-average molecular weight of the structural units according to the general formula (III) to be 500 to 10 000 g/mol, more preferably 800 to 4000 g/mol, and very preferably 1000 to 3000 g/mol.

Good results are obtained in particular if all of groups $R^4$ and $R^5$ of the structural units according to the general formula (III) independently of one another are selected from linear $C_4\text{-}C_{14}$ alkylene groups and branched $C_4\text{-}C_{14}$ alkylene groups, more preferably from linear $C_6\text{-}C_{14}$ alkylene groups and branched $C_6\text{-}C_{14}$ alkylene groups, and most preferably from linear $C_8\text{-}C_{12}$ alkylene groups and branched $C_8\text{-}C_{12}$ alkylene groups, if at least 50%, preferably at least 80%, and more preferably at least 90% of all the groups $R^1, R^2, R^3, R^4$ and $R^5$ in all structural units having the general formulas (I), (II), and (III) are in each case a linear or branched $C_8\text{-}C_{12}$ alkylene group.

According to one preferred embodiment, one of the groups $R^4$ and $R^5$ is a linear or branched $C_5\text{-}C_7$ alkylene group, preferably $C_6$ alkylene group, and the other of $R^4$ and $R^5$ is a linear or branched $C_9\text{-}C_{11}$ alkylene group, preferably $C_{10}$ alkylene group.

As set out, it is most preferred in this embodiment as well for all of the groups $R^4$ and $R^5$ of the structural units according to the general formula (III) to be selected independently of one another from linear $C_6\text{-}C_{14}$ alkylene groups and branched $C_6\text{-}C_{14}$ alkylene groups or from linear $C_8\text{-}C_{12}$ alkylene groups and branched $C_8\text{-}C_{12}$ alkylene groups.

In a development of the inventive concept, it is proposed that at least 50 wt %, more preferably at least 70 wt %, very preferably at least 80 wt %, very preferably at least 90 wt % of all, and most preferably all, of the structural units according to the general formula (I) have the general formula (III). Particularly in the case of a very high fraction of structural units according to the general formula (II), the degree of crystallinity of the polyurethane may be comparatively high.

Especially if a reduced degree of crystallinity of the polyurethane is desired, it is preferred to provide branched alkylene groups and more particularly branched $C_{8\text{-}12}$ alkylene groups as groups $R^4$ and $R^5$ in the general formula (III).

In a development of the inventive concept, it is proposed that the polyurethane of the press cover or transport belt has a mixture of different polyol structural units, of which some have the general formula (II) and some have the general formula (III). For example, out of all the structural units of the polyurethane according to the general formula (I), 10% to 90% may have the general formula (II) and 10% to 90% the general formula (III). According to a further example, the distribution of the polyol structural units according to the general formulas (II) and (III) may be such that a total of 20 to 40 wt % (such as about 25 wt %) of the radicals $R^3$, $R^4$ and $R^5$ are a linear or branched $C_4\text{-}C_7$ alkylene group and the balance to 100 wt % (such as about 75 wt %) of the radicals $R^3$, $R^4$ and $R^5$ are a linear or branched $C_8\text{-}C_{12}$ alkylene group. In the case of this embodiment it is additionally preferred for 20 to 40 wt % (such as about 25 wt %) of the radicals $R^3$, $R^4$ and $R^5$ to be a linear or branched $C_5\text{-}C_7$ alkylene group and the balance to 100 wt % (such as about 75 wt %) of the radicals $R^3$, $R^4$ and $R^5$ to be a linear or branched $C_9\text{-}C_{11}$ alkylene group, or for 20 to 40 wt % (such as about 25 wt %) of the radicals $R^3$, $R^4$ and $R^5$ to be a linear or branched $C_6$ alkylene group and the balance to 100 wt % (such as about 75 wt %) of the radicals $R^3$, $R^4$ and $R^5$ to be a linear or branched $C_{10}$ alkylene group.

There is no particular restriction on the nature of the isocyanate component ii) used in the present invention. Good results are obtained in particular if the isocyanate component ii) comprises one or more diisocyanate compounds selected from the group consisting of toluene 2,4-diisocyanates (TDI), methylenediphenyl isocyanates (MDI), hexamethylene diisocyanates (HDI), naphthalene 1,5-diisocyanates (NDI), isophorone diisocyanates (IDI), cyclohexane diisocyanates (CHDI), phenylene diisocyanates (PPDI), o-tolidine diisocyanate (TODD, 3,3'-dimethyl-4,4'-biphenyl diisocyanate, xylylene diisocyanate (XDI), bis (isocyanatomethyl)cyclohexane (H6XDI), and mixtures of two or more of the aforesaid compounds.

Nor is there any particular restriction on the nature of the at least one crosslinker used in component iii) in the present invention. The component iii) for this purpose may more particularly contain at least one crosslinker which is selected from the group which consists of amines, polyols, and any desired mixtures of two or more of the aforesaid compounds.

Examples of suitable amine compounds are those selected from the group consisting of 4,4'-methylenebis(2,6-diethyl-3-chloroaniline), 4,4'-methylenebis(2-chloroaniline), 4,4'-methylenebis(2-ethylbenzylamine), 4,4'-methylenebis(2,6-diethylaniline), 4,4'-methylenebis(cyclohexylamine), diethylmethylbenzenediamine, 4,4'-diaminodicyclohexyl-methane, 4,4'-diamino-3,3'-dimethyldicyclohexylmethane, 4,4'-diaminodiphenylmethane, 3,5-dimethylthiotolyl-diamine, 3,5-dimethyltolyl-2,4-diamine, 3,5-dimethyltolyl-2,6-diamine, polytetramethylene oxide di-p-aminobenzoate, poly(tetramethylene-3-methyltetramethylene ether) glycol bis(4-aminobenzoate), trimethylene bis(4-aminobenzoate), isobutyl 4-chloro-3,5-diaminobenzoate, tetramethylammo-nium bromide, ethylenediamine, hydrazine, hexamethylene-diamine, o-phenylenediamine, m-phenylenediamine, p-phe-nylenediamine, 1,4-diaminocyclohexane, 1,2-diaminocyclohexane, isophoronediamine, diethyltoluenediamine, 3,5-dimethylthio-2,4-toluenedi-amine, 3,5-dimethylthio-2,6-toluenediamine, and any desired mixtures of two or more of the aforesaid compounds.

Instead of an amine compound or in addition to it, the component iii) may contain at least one short-chain polyol, preferably short-chain diol, which is preferably selected from the group which consists of ethylene glycol, diethylene glycol, propylene glycol, dipropylene glycol, polypropylene glycol, polybutylene glycol, 1,4-butanediol, 1,3-propane-diol, 1,5-pentanediol, 1,6-hexanediol, polyethylene glycol, N—N'-bis(2-hydroxypropylaniline), hydroquinone bis-2-hydroxyethyl ether, 1,3-bis(2-hydroxyethyl)resorcinol, tri-ols, polytetrahydrofurans and any desired mixtures of two or more of the aforesaid compounds. If these compounds have a structural unit of the general formula (I), they are counted among the aforesaid structural units and are therefore rel-evant as to whether the polyurethane does or does not meet the criteria a) to c).

Aside from this, the component iii) may also comprise a polycarbonate polyol according to the general formula (IV):

$$\text{HO—R}^6\text{—(O(O)C—O—R}_7\text{)}_{n3}\text{—OH} \qquad \text{(IV),}$$

in which $R^6$ and $R^7$ independently of one another are a linear or branched $C_{1-14}$ alkylene group which is optionally substituted by OH groups, and very prefer-ably, with particular preference, a linear or branched $C_{4-10}$ alkylene group which is optionally substituted by OH groups, and $n_3$ is an integer between 2 and 50. The molecular weight of this polycarbonate polyol is pref-erably 1000 to 3000 g/mol. This polycarbonate polyol is among the aforesaid structural units and is therefore relevant as to whether the polyurethane does or does not meet the criteria a) to c).

For the initiation of the crosslinking reaction it is further preferred for component iii) also to contain at least one catalyst, with the at least one catalyst preferably being an organometallic compound or a salt of Zn, Co, Bi, Hg, Cd, K or another metal and/or being a tertiary amine and more preferably being a compound which is selected from the group which consists of dibutyltin dilaurate, tin octoate, dioctyltin diacetate, dibutyltin mercaptide, dibutyltin oxide, dimethyltin mercaptide, dioctyltin mercaptide, dimethyltin carboxylate, and any desired mixtures of two or more of the aforesaid compounds. Preferred examples of tertiary amines are bis(2-dimethylaminoethyl) ether, alkylmorpholines, 1 N,N-alkylbenzylamine, 1,2-dimethylimidazole, N,N-dim-ethylcyclohexylamine and N,N,N',N'-tetramethylenedi-amine. Further suitable catalysts are described in Szycher's Handbook of Polyurethanes, chapter 10, ISBN 0-8493-0602-7.

In a development of the inventive concept, it is proposed, at least in the at least one layer of the press cover or transport belt of the invention that is formed of the above-described polyurethane, that the polyurethane forms the matrix in which a laid fiber fabric or a woven fiber fabric is embedded.

The press cover of the invention may have a single-layer or multilayer design. If the press cover has a multilayer design, it is preferred for at least the outer layer to be composed as described above. Alternatively to this, it is also possible for the above-described polyurethane to be present only in individual regions of the press cover, such as in the press zone or at the shoe margin, for example.

A further subject of the present invention is a process for producing a press cover or transport belt described above, the process comprising the following steps:
1) providing a polyol component i), an isocyanate com-ponent ii), and a component iii) comprising at least one crosslinker, where the polyol component i) contains at least one polyol which is composed of structural units according to the following general formula (I), $$\text{—O—R}^1\text{—X—R}^2\text{—O—} \qquad \text{(I),}$$

in which all of $R^1$ and $R^2$ of the one or more mutually different structural units according to the general formula (I) independently of one another are identi-cal or different and are selected from linear $C_1$-$C_{20}$ alkylene groups and branched $C_1$-$C_{20}$ alkylene groups, and all of groups X of the one or more mutually different structural units independently of one another are identical or different and are selected from bond, O, C(O)—O and O—C(O)—O,
2) reacting at least part of the polyol component i), the isocyanate component ii), and the component iii) to give a polyurethane such that the polyurethane is composed to an extent of at least 90 wt % of one or more mutually different structural units according to the general formula (I), where at least 70 wt % of the structural units according to the general formula (I) meet the following criteria:
   a) at least 80% of the groups X are O—C(O)—O and the remainder of the groups X are selected from O and C(O)—O, and
   b) the average chain length of all the groups $R^1$ and $R^2$ is 8 or more than 8 carbon atoms, and
   c) at least 50% of the groups $R^1$ and $R^2$ are indepen-dently of one another each a linear or branched $C_8$-$C_{12}$ alkylene group, and
3) forming a press cover or transport belt using the polyurethane produced in step 2).

A further subject of the present invention is a shoe press for dewatering a fibrous web, more particularly a paper, cardboard, tissue or pulp web, which comprises a press cover described above.

The present invention further relates to a machine for producing or treating a fibrous web, more particularly paper, cardboard or tissue machine, which comprises a transport belt described above.

The present invention is described below purely illustra-tively, using advantageous embodiments and with reference to the appended drawings.

DETAILED DESCRIPTION OF THE INVENTION

Figures 1, 2:
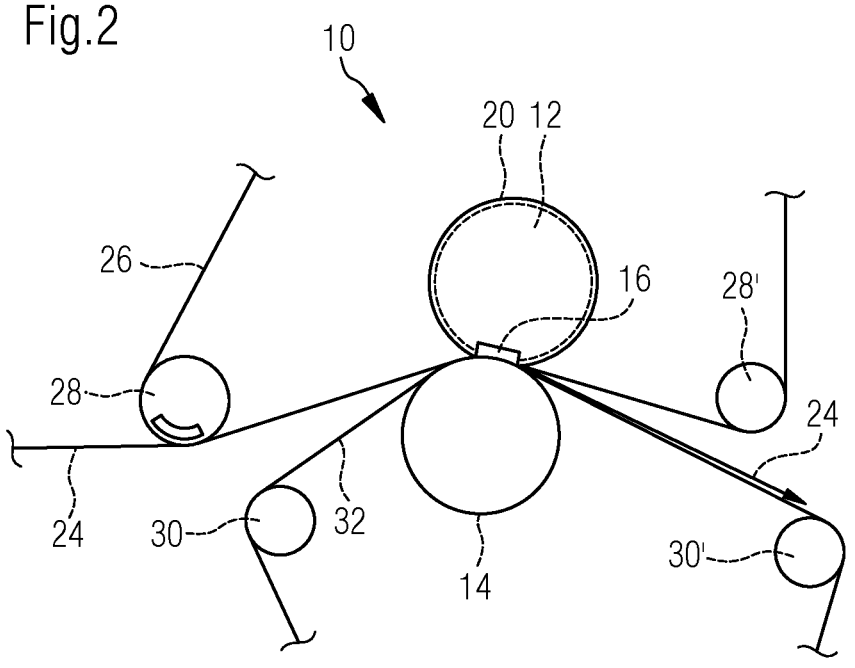
FIG. 1 shows a schematic view of a shoe press having a press cover according to one exemplary embodiment of the present invention.
FIG. 2 shows a schematic view of a press section of a paper machine, comprising a shoe press and a transport belt, according to one exemplary embodiment of the present invention.

Represented in FIG. 1 is a shoe press 10 which comprises a shoe roll 12 and an opposing roll 14. While the opposing roll 14 consists of a rotating, cylindrical roll, the shoe roll 12 is composed of a shoe 16, a stationary yoke 18 carrying said shoe, and a press cover 20. The shoe 16 here is supported by the yoke 18 and pressed via hydraulic press elements (not represented) against the press cover 20 running around these elements. Because of the concave architecture of the shoe 16, a comparatively long press nip 22 is produced at its side opposite the opposing roll 14.

The shoe press 10 is suitable especially for dewatering fibrous webs 24, such as paper webs. In the operation of the shoe press, a fibrous web 24 is passed with one or two press felts 26, 26' through the press nip 22, and the liquid which emerges from the fibrous web 24, owing to the pressure exerted on the fibrous web 24 in the press nip 22, said liquid containing not only water but also dissolved and undissolved compounds, such as fibers, fiber fragments, fillers and/or additives, for example, is temporarily taken up by the press felt or press felts 26, 26' and by indentations (not represented) provided in the press cover surface. After having left the press nip 22, the liquid taken up by the press cover 20 is spun off from the press cover 20, after which the press cover 20 enters the press nip 22 again. Moreover, after leaving the press nip 22, the water taken up by the press felt 26, 26' is removed with suction elements.

Owing to the press nip 22, which is comparatively long because of the concave architecture of the shoe 16 on its side opposite the opposing roll 14, the dewatering of the fibrous web 24 that is achieved with a shoe press 10 of this kind, in comparison to a press consisting of two rotating rolls, is considerably better, and so the subsequent thermal drying can be made shorter correspondingly. In this way the dewatering of the fibrous web 24 that is achieved is particularly gentle.

FIG. 2 shows a detail of a press portion of a paper machine, comprising a shoe press 10. In this case the shoe press 10, as in the case of the embodiment represented in FIG. 1 as well, comprises a shoe roll 12, having a press cover 20 and a press element or shoe 16, and an opposing roll 14, with a press nip being formed between the shoe 16 and the opposing roll 14. Moreover, this part of the paper machine comprises two suction rolls 28, 28' and two deflection rolls 30, 30'. In the operation of the paper machine, a felt 26 guided through the suction rolls 28, 28', and picking up the fibrous web 24 at the suction roll 28, is passed through the press nip. Moreover, below the felt 26 carrying the fibrous web 24, a transport belt or transfer belt 32, carried by the deflection rolls 30, 30', is passed through the press nip, and in the press nip the fibrous web 24 is taken over from the felt 26 by the transfer belt 32 and is taken off out of the press nip via the deflection roll 30'. Because of the pressure exerted on the fibrous web 24 in the press nip, liquid emerges from the fibrous web, and contains not only water but also dissolved and undissolved compounds, such as fibers, fiber fragments, fillers, and/or additives, for example, and which is taken up temporarily by the felt 26 and by indentations present in the press cover surface. After having left the press nip, the liquid taken up by the press cover 20 is spun off from the press cover 20, after which the press cover 20 enters the press nip again. Moreover, after having left the press nip, the water taken up by the felt 26 is removed with suction elements provided on the suction roll 28'. Because of the press nip, which is comparatively long owing to the concave architecture of the shoe 16, a shoe press of this kind, in comparison to a press consisting of two rotating rolls, achieves substantially better dewatering of the fibrous web 24, and so the subsequent thermal drying can be made shorter correspondingly. In this way the dewatering of the fibrous web 24 that is achieved is particularly gentle.

LIST OF REFERENCE NUMERALS

10 shoe press
12 shoe roll
14 opposing roll
16 shoe
18 stationary yoke
20 press cover
22 press nip
24 fibrous web
26, 26' press felt
28, 28' suction rolls
30, 30' deflection rolls
32 transport belt/transfer belt

The invention claimed is:

1. A press cover for a press roll or a transport belt, the press cover or the transport belt comprising:

at least one polyurethane-containing layer, the polyurethane being obtained by a reaction, in one or more steps, of i) a polyol component;

ii) an isocyanate component; and iii) a component containing at least one crosslinker;

wherein said polyol component comprises at least 90 wt % of one or more mutually different structural units according to the following general formula (I):

$$-O-R^1-X-R^2-O- \tag{I};$$

wherein all $R^1$ and $R^2$ in the one or more different structural units according to the general formula (I) independently of one another are identical or different and are selected from linear $C_1$-$C_{20}$ alkylene groups, and all of groups X in the one or more different structural units independently of one another are identical or different and are selected from the group consisting of bond, O, C(O)—O, and O—C(O)—O; and at least 70 wt % of the structural units according to the general formula (I) meet the following criteria:

a) at least 80% of the groups X are O—C(O)—O and a remainder of the groups X are selected from O and C(O)—O; and b) an average chain length of all the groups $R^1$ and $R^2$ is 8 or more than 8 carbon atoms; and c) at least 50% of the groups $R^1$ and $R^2$ are independently of one another each a linear $C_8$-$C_{12}$ alkylene group.

2. The press cover or transport belt according to claim 1, wherein the press roll is configured for a shoe press for dewatering a fibrous web, and the transport belt is configured for a machine for producing or treating a fibrous web.

3. The press cover or transport belt according to claim 1, wherein at least 80 wt % of the one or more mutually different structural units of the polyol component according to the general formula (I) meet in each case the criteria a) to c).

4. The press cover or transport belt according to claim 1, wherein all of the one or more mutually different structural units of the polyol component according to the general formula (I) meet the criteria a) to c).

5. The press cover or transport belt according to claim 1, wherein all the groups $R^1$ and $R^2$ of the one or more different structural units according to the general formula (I) independently of one another are identical or different and are selected from linear $C_4$-$C_{14}$ alkylene groups.

6. The press cover or transport belt according to claim 1, wherein the polyol component of the polyurethane contains two, three or more mutually different structural units according to the general formula (I), where the group $R^1$ and/or the group $R^2$ of each of the two, three or more mutually different structural units according to the general formula (I) are different from every other of the two, three or more mutually different structural units according to the general formula (I).

7. The press cover or transport belt according to claim 1, wherein the average chain length of all the groups $R^1$ and $R^2$ of the one or more different structural units according to the general formula (I) is 8 to 15 carbon atoms.

8. The press cover or transport belt according to claim 1, wherein at least 70% of the groups $R^1$ and $R^2$ of the one or more different structural units according to the general formula (I) independently of one another are each a linear $C_8$-$C_{12}$ alkylene group.

9. The press cover or transport belt according to claim 8, wherein all of the groups $R^1$ and $R^2$ of the one or more different structural units according to the general formula (I) independently of one another are each a linear $C_8$-$C_{12}$ alkylene group.

10. The press cover or transport belt according to claim 1, wherein at least a portion of the structural units according to the general formula (I) have the general formula (II):

$$—(O—R^3—O—C(O))n^1\text{-}O—$$ (II);

wherein $R^3$ is selected from linear $C_1$-$C_{20}$ alkylene groups, and $n^1$ is an integer of at least 3.

11. The press cover or transport belt according to claim 10, wherein $n^1$ is an integer between 4 and 25.

12. The press cover or transport belt according to claim 10, wherein a weight-averaged molecular weight of the structural units according to the general formula (I) and/or of the general formula (II) is 500 to 10,000 g/mol.

13. The press cover or transport belt according to claim 10, wherein the group $R^3$ of the structural units according to the general formula (II) is selected from linear $C_6$-$C_{14}$ alkyl groups or from linear $C_8$-$C_{12}$ alkyl groups.

14. The press cover or transport belt according to claim 10, wherein at least 50 wt % of the structural units according to the general formula (I) have the general formula (II).

15. The press cover or transport belt according to claim 10, wherein all of the structural units according to the general formula (I) have the general formula (II).

16. The press cover or transport belt according to claim 10, wherein 80% to 99% of the structural units according to the general formula (I) have the general formula (II), while a remainder of the structural units have the general formula (I) in which the group X is O.

17. The press cover or transport belt according to claim 1, wherein at least a portion of the structural units according to the general formula (I) have the general formula (III):

$$—(O—R^4—O—C(O)—O—R^5—O—C(O))n^2\text{-}O—$$ (III)

where $R^4$ and $R^5$ are different from one another and independently of one another are selected from linear $C_1$-$C_{20}$ alkylene groups, and $n^2$ is an integer of at least 2.

18. The press cover or transport belt according to claim 17, wherein $n^2$ is an integer between 2 and 50.

19. The press cover or transport belt according to claim 17, wherein a weight-averaged molecular weight of the structural units according to the general formula (III) is 500 to 10,000 g/mol.

20. The press cover or transport belt according to claim 17, wherein all of the groups $R^4$ and $R^5$ of the structural units according to the general formula (III) are selected from linear $C_6$-$C_{14}$ alkyl groups or from linear $C_8$-$C_{12}$ alkylene groups.

21. The press cover or transport belt according to claim 1, wherein:

said isocyanate component (ii) comprises one or more diisocyanate compounds selected from the group consisting of toluene 2,4 diisocyanates, methylenediphenyl isocyanates, hexamethylene diisocyanates, naphthalene 1,5-diisocyanates, isophorone diisocyanates, cyclohexane diisocyanates, p-phenylene diisocyanates, o-tolidine diisocyanate, 3,3'-dimethyl-4,4'-biphenyl diisocyanate, xylylene diisocyanate, bis(isocyanatomethyl) cyclohexane, and mixtures of two or more thereof; and said component containing the at least one crosslinker (iii) contains at least one crosslinker selected from the group consisting of amines, polyols, and any desired mixtures of two or more of the aforesaid compounds.

22. A shoe press for dewatering a fibrous web, the shoe press comprising a press roll configured for dewatering paper web, cardboard web, tissue web, or pulp web, said press roll having a press cover according to claim 1.

23. A machine for producing or treating a fibrous web, the machine comprising a transport belt according to claim 1.

24. The press cover or transport belt according to claim 1, wherein said polyol component comprises 100 wt % of one or more mutually different structural units of general formula (I).

\* \* \* \* \*